No. 728,378. PATENTED MAY 19, 1903.
L. J. DAVIS.
AUTOMATIC POULTRY FEEDER.
APPLICATION FILED JUNE 18, 1902.
NO MODEL.
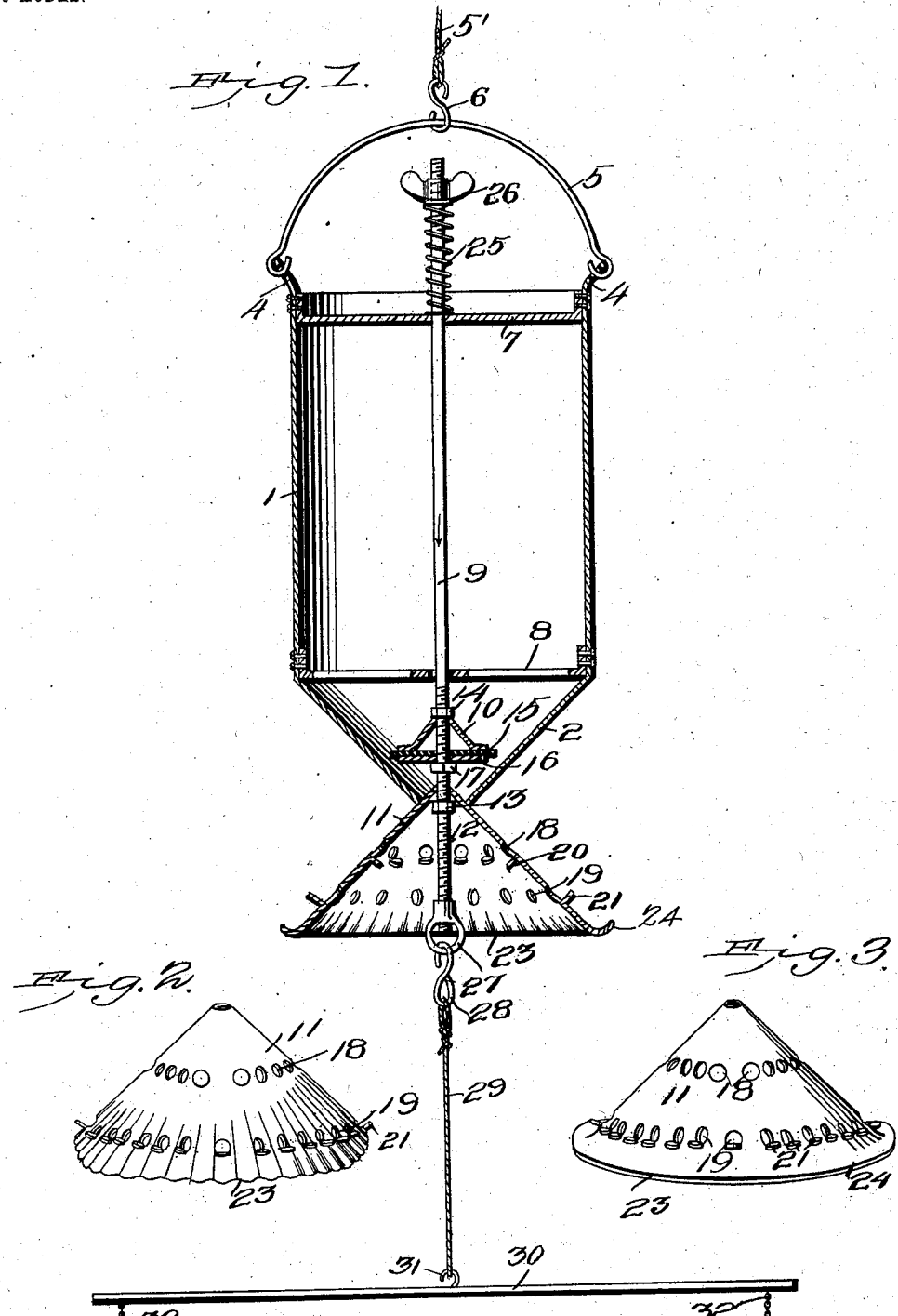

No. 728,378. Patented May 19, 1903.

UNITED STATES PATENT OFFICE.

LINFORD J. DAVIS, OF BATTLECREEK, MICHIGAN.

AUTOMATIC POULTRY-FEEDER.

SPECIFICATION forming part of Letters Patent No. 728,378, dated May 19, 1903.

Application filed June 18, 1902. Serial No. 112,214. (No model.)

*To all whom it may concern:*

Be it known that I, LINFORD J. DAVIS, a citizen of the United States, residing at Battlecreek, in the county of Calhoun and State of Michigan, have invented a new and useful Automatic Poultry-Feeder, of which the following is a specification.

The invention relates to improvements in automatic poultry-feeders.

The object of the present invention is to improve the construction of poultry-feeders and to provide a simple and comparatively inexpensive apparatus adapted to enable fowls to obtain food at any time and capable of distributing grain over a predetermined area and of causing chickens and other fowl to scratch for the food, and thereby obtain the necessary exercise.

A further object of the invention is to provide an apparatus of this character which will not require the attention of a person except for the purpose of keeping the hopper supplied with grain and which will enable the grain to be economically discharged in predetermined quantities to prevent it from being wasted.

The invention consists in the construction and novel combination and arrangement of parts, hereinafter fully described, illustrated in the accompanying drawings, and pointed out in the claims hereto appended.

In the drawings, Figure 1 is a vertical sectional view of a poultry-feeder constructed in accordance with this invention. Fig. 2 is a detail view illustrating the construction of the scattering device. Fig. 3 is a similar view of a slight modification of the scattering device.

Like numerals of reference designate corresponding parts in all the figures of the drawings.

1 designates a cylindrical hopper open at the top and provided with a conical lower portion 2, truncated to provide an open bottom for the discharge of the grain or other contents of the hopper, as hereinafter explained. The hopper is provided at its top with upwardly-extending ears 4, to which is connected a bail 5, and it is suspended from a ceiling or other suitable support by means of a flexible connection 5, having a hook 6 for engaging the bail, and by arranging the hopper different distances from the floor or other supporting-surface the grain or other contents may be scattered over a greater or less area, as desired. The hopper is provided above its lower tapered portion with upper and lower horizontal guide-bars 7 and 8, having centrally-alined apertures for the reception of a vertically-movable rod 9, which carries an upper cut-off 10 and a lower combined cut-off and scattering device 11, consisting, preferably, of a cone adjustably mounted on the lower portion of the rod 9 and having its apex extended into the opening of the tapered portion of the hopper and normally closing the latter to prevent the escape of grain or other material. The lower portion 12 of the rod 9 is threaded and the adjustable scattering device is provided at its apex with a nut 13 and is adapted to be rotated to arrange it the desired distance from the upper cut-off 10 to secure the desired discharge of the grain when the apparatus is operated, as hereinafter explained. The upper cut-off 10 consists of a cone engaged at its apex by a nut 14 and provided at its base with a flexible disk 15, of rubber or other suitable material, which is held against the cone by means of a plate 16 and a nut 17. The plate 16, which is constructed of sheet metal or other suitable material and which is substantially the same diameter as the base of the cone of the upper cut-off 10, terminates short of the periphery of the flexible disk, which projects outward, as clearly shown in Fig. 1, and which is adapted when the rod is carried downward to engage the inner face of the tapered lower portion of the hopper to cut off the flow of grain. The nut 17 engages the lower face of the plate 16, and the nut 14 engages the apex of the cone of the cut-off 10, and by this construction the parts of the upper cut-off are firmly secured to the threaded portion of the vertically-movable rod.

When the rod is moved downward by the means hereinafter described, the scattering-cone is carried downward away from the bottom of the hopper, and the grain which occupied the space between the scattering-cone and the upper cut-off is carried downward and allowed to flow through the hopper upon the scattering-cone. The grain falling upon the scattering-cone is thrown outward and scattered over the surface of the floor or ground, and the scattering-cone is also provided with apertures 18 and 19 to permit some of the grain to pass through it and to fall directly beneath the cone, whereby the feed will be uniformly distributed throughout a predetermined area. The openings are formed by punching the metal of the cone, and the metal may be only partially severed to form projections 20 and 21, which may be extended inward or outward and which will serve to intercept and deflect the grain to scatter the same. The lower or outer portion 23 of the scattering-cone may be fluted or crimped to divide the grain and cause a uniform scattering of the same, and, as shown in Fig. 3, the base of the cone may be provided with a partially-upturned portion or flange 24 to throw the grain upward and outward.

The scattering device, which forms the lower cut-off, is normally held against the bottom of the hopper by means of a coiled spring 25, interposed between the upper guide-bar 7 and a thumb-nut 26, disposed on an upper threaded portion of the rod and adapted to be adjusted to regulate the tension of the spring. The lower end of the rod is provided with a suitable eye 27, which is engaged with a hook 28, similar to the hook 6, and which is connected by a cord 29 or other flexible connection with a depressible platform 30, centrally connected, by means of a screw-hook 31 or other suitable fastening device, with the cord 29 and adapted to be depressed by the weight of a chicken or other fowl to operate the cut-offs. The platform is connected at its ends with the floor or other supporting-surface by means of short chains 32, connected with the lower face of the platform and secured to the said floor or other supporting-surface by means of screw eyes or hooks; but any other suitable means may be employed for connecting the platform with the floor and for permitting the necessary vertical movement of the platform. The floor or other supporting-surface is designed to be strewn with suitable rubbish, so that chickens and other fowl will be compelled to scratch for the grain, thereby securing the necessary exercise and insuring the best possible condition for egg production.

It will be seen that the apparatus is exceedingly simple and inexpensive in construction, that it is adapted to permit poultry to obtain food at any time, and that it will save time and labor in feeding poultry and will prevent waste of the grain or other material. It will also be clear that the combined cut-off and scattering device is adapted to be readily adjusted to arrange it the desired distance from the upper cut-off for securing the desired discharge of grain at each operation of the apparatus, and that the grain is uniformly scattered over a given area, and that it falls through and beneath the scattering device as well as beyond the same.

What is claimed is—

1. An apparatus of the class described comprising a hopper provided at its bottom with an opening, a normally open upper cut-off, a lower cut-off normally closing the bottom of the hopper, and operating mechanism for opening the lower cut-off and closing the upper cut-off, whereby a predetermined quantity of feed is discharged, substantially as described.

2. An apparatus of the class described comprising a hopper provided at its bottom with an opening, a normally open upper cut-off, a combined cut-off and scattering device arranged at the bottom of the hopper and normally closing the same and adapted when opened to scatter the grain or other material, and means for operating the upper cut-off and the combined cut-off and scattering device, substantially as described.

3. An apparatus of the class described comprising a hopper provided with an opening, a combined cut-off and scattering device arranged at the opening and normally closing the hopper and arranged to throw the grain or other material outward to scatter the same, and provided with openings to permit a portion of the grain to pass through it, and means for operating the combined cut-off and scattering device, substantially as described.

4. An apparatus of the class described comprising a hopper provided with an opening, a combined cut-off and scattering device consisting of a cone and normally closing the hopper and provided with openings to permit grain to pass through it, and means for operating the combined cut-off and scattering device, substantially as described.

5. An apparatus of the class described comprising a hopper having an opening, a combined cut-off and scattering device consisting of a cone provided beyond the hopper with openings to permit grain to pass through it and having projections, and means for operating the combined cut-off and scattering device, substantially as described.

6. An apparatus of the class described comprising a hopper having an opening, a combined cut-off and scattering device consisting of a cone provided beyond the hopper with openings and having its lower or outer portion corrugated to effect a uniform scattering of the grain, and means for operating the combined cut-off and scattering device, substantially as described.

7. An apparatus of the class described comprising a hopper provided with a conical lower portion having an opening, an upper cut-off located within the hopper and normally held above the bottom of the same, a lower combined cut-off and scattering device consisting of a cone normally closing the bottom of the hopper and connected with the upper cut-off and provided with openings, and means for operating the upper cut-off and the lower combined cut-off and scattering device, substantially as described.

8. An apparatus of the class described comprising a hopper, a vertically-movable spring-actuated rod guided on the hopper, an upper cut-off comprising a cone, a flexible disk fitted against the base of the cone, and a plate engaging the flexible disk and terminating short of the periphery thereof, fastening devices mounted on the rod and engaging the cut-off at the top and bottom thereof, a lower cut-off, and means for operating the rod, substantially as described.

9. An apparatus of the class described comprising a hopper provided with suitable guides, a rod extending through the hopper and arranged in the guides, a spring for actuating the rod to hold the same normally elevated, an adjusting device for regulating the tension of the spring, upper and lower cut-offs mounted on the rod, a depressible platform connected with the rod, and means for loosely connecting the platform with the floor or other supporting-surface, substantially as described.

10. An apparatus of the class described comprising a hopper provided with a bottom opening, a rod extending through the bottom of the hopper and having a threaded portion, an upper cut-off mounted on the rod, and a lower combined cut-off and scattering device adjustably engaging the screw-threads of the rod and adapted to be moved longitudinally thereon, and means for operating the rod, substantially as described.

11. An apparatus of the class described comprising a hopper having an opening, a combined cut-off and scattering device consisting of a cone provided at its periphery with an upturned flange to throw the grain outward and upward, and means for operating the combined cut-off and scattering device, substantially as described.

In testimony that I claim the foregoing as my own I have hereto affixed my signature in the presence of two witnesses.

LINFORD J. DAVIS.

Witnesses:
F. P. BOUGHTON,
CHARLES AUSTIN.